Patented Feb. 17, 1953

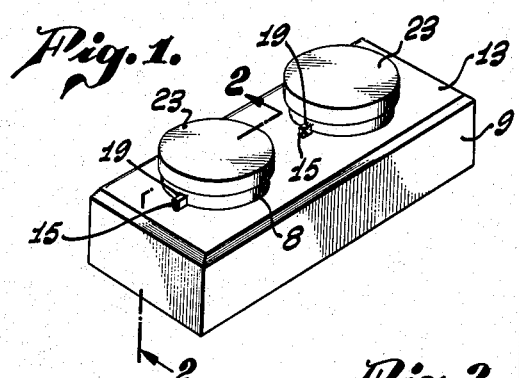
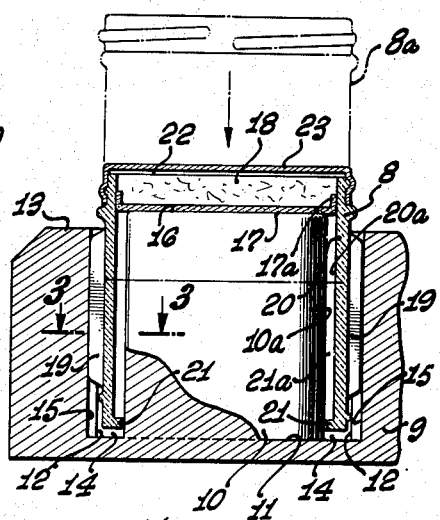

2,628,743

UNITED STATES PATENT OFFICE 2,628,743

COLD CREAM AND CHEMICAL CREAM DISPENSING JAR AND CONTAINER WITH FOLLOWER RESTING ON A VERTICAL COLUMN

Thomas J. Newlyn, Los Angeles, Calif.

Application October 19, 1948, Serial No. 55,408

4 Claims. (Cl. 222—173)

My invention relates to improvements in cold cream, cosmetic and chemical cream dispensing jars or containers and their construction and particularly to those jars or containers composed of more than one part or unit or body and are divisible and separable and functionable apart and/or in combination with each other and of the class and character above described and indicated.

Heretofore users and especially women have been compelled to dig down deep into the cream content of the age-old ordinary single unit cold cream jar and claw out the cream therein with their fingers. They could not judge the right amount of cream to lift out so that large masses came out in their hand and dripped through their fingers and onto their clothes and toilet tables and other dainty things. If their finger nails were extending or artificial and long, in clawing out the cream they would often leave a high fluctuating mound of cream coning from a base at the bottom to an appex near the top of the cold cream jar and which mound of cream could not be raised with the fingers at all and was often wasted if not dipped or spooned out with an instrument; while all the time their cold cream jars remained sticky and oily and messy and which condition said women would frown upon but had to tolerate there being no other method or form of cold cream jar which would circumvent or eliminate such intolerable conditions and so were unforgivingly resigned to their deplorable cold cream fate.

The object of my invention is to construct a device which is an altogether new departure in the form and style and character of such outmoded cold cream jars or cream container devices and which device will circumvent and eliminate such conditions as above described and indicated and which invention will improve generally and enhance the utility of such type devices and establish an altogether new departure and style and form and basic principle of function and operation in respect and relation to such devices named and which I accomplish by constructing said type of device in two parts or divisions or bodies and as hereinafter specified and described.

The specific object of my invention is to provide a device of the class and character indicated and described composed substantially of glass, plastics, ceramics, metal, wood or any other suitable material or substance or fabrication; hollow, solid, opaque, opal or translucent; molded, casted, expressed, impressed, constructed or fabricated in the shape and form described herein adaptable and functionable as a cold cream jar or cream container unit or as a "refill" in respect and relation to the device functionable and operable as a whole or as a single independent unit separate and apart from its constituent and component body respectively, and a further object of the device is to function and operate substantially as hereinafter described and specified to lift and maintain the cream content of the device at a convenient "constant level" so that said content need not be clawed out or dug out of the jar or container as heretofore but may be easily dispensed from the top of the jar and lifted away in a thin slice or even or selected layer by means of the index finger or other fingers of the hand.

With the above and other objects in view, which will appear as the description proceeds, the invention resides in the combination and arrangement of parts and in the detail of construction and operation hereinafter described and claimed, it being understood that changes in the precise embodiment of the invention herein disclosed, may be made within the scope of what is claimed, without departing from the spirit of the invention.

The invention is fully disclosed in the following specifications of which the accompanying drawing forms a part and in which the separate parts of my improvement are designated by suitable reference characters in each of the views, like letters of reference indicating corresponding parts in each figure respectively.

Referring to the drawing in detail:

Fig. 1 is a perspective view of the embodiment of the device and as constructed in accordance with the present invention.

Fig. 2 is a sectional view of the device taken through 2—2 Fig. 1 looking in direction of the arrows.

Fig. 3 is a sectional view of a segment of the device taken through 3—3 Fig. 2 looking in direction of the arrows.

Fig. 4 is a sectional view showing the upper and cream container body of the device and its construction as a detachable, separable and independent unit and as a cold cream refill jar unit operable in combination with the receptacle or lower body of the device.

Fig. 5 is a sectional view of an attachable and detachable supplementary composite type retaining, fabricating and cream dispensing screw cap device adaptable and operable in relation to the invention.

Fig. 6 is a plan view in elevation showing a hexagonal alternate castor 6-gang type lower body of the device having a common center and multiplicity of receptacles as bases for the upper body of the device.

Fig. 7 illustrates the cold cream content of the upper and cream container body as maintained at a selected constant level by function of the device and the cream content being skimmed off for use in a thin even layer by the sweeping action of the index finger of the hand.

In carrying out the invention into effect there is provided two divisible and separable bodies an upper body 8 and a lower body 9 composed of any suitable or desired material or substance. Upper body 8 functions as a cream container unit and lower body 9 functions as a base and receptacle for upper body 8 and operable in respect and relation thereto as hereinafter described. Within body 9 is fabricated a substantial cylinder or cylindrical column 10 projecting vertically from base 11 and extending evenly with or at a suitable height above or below the top-level 13 of body 9 establishing an annular well and which cylinder 10 has a circular wall 10a and a relative opposing surrounding circular wall 12—12 parallel circumferentially to said wall 10a and with space there-between forming in respect and relation thereto and therewithin body 9 a circular interstitial well 14—14 as shown in Figure 2 and more definitely and relatively in Figure 3, and in which well 14—14 oppositely disposed and fabricated in wall 12—12 of body 9 are two vertical guiding grooves 15—15 of suitable width and depth extending from basal point 11 to the top-level 13 of body 9 and engaging in juxtaposition with guiding ribs or spur-swedges 19—19 of body 8 and which said spur-swedges 19—19 are adaptable and slidable vertically in respect and relation to said guiding grooves 15—15 and are adaptable to further function while in operation and while engaged in juxtaposition as described to circumvent lateral or twisting movements of body 8 in relation to body 9 as and when screw cap 23 is removed from or screwed back upon body 8 and to further function to guide body 8 vertically and downward along the full path and extension of guiding grooves 15—15 of body 9 in the full function, performance and descent of body 8 from top to bottom thereof and therein said grooves and telescope over and around cylinder 10 and into well 14—14 of body 9 as indicated and described and as shown in Figure 2. Body 9 and cylinder 10 respectively as shown in Figures 2 and 3 are constructed in one substantial piece or mass but not of necessity, either body 8 or body 9 may be composed of one material or substance while the alternate component body may be composed of another material or substance and vice versa and otherwise differently constructed, and cylinder 10 may be separable and connectable and adaptable in respect and relation to body 9 and may be otherwise fabricated within body 9 completing same as one definite body ipso facto forming in respect and relation thereto said interstitial well 14—14 as above described. Upper body 8 is movable and slidable vertically in respect and relation to lower body 9 and in the manner described, and is shown in "phantom" as body 8x superimposed above body 9 before descent into body 9 and as shown below after descent into body 9 and reposing therewithin the aforementioned well 14—14 of said body 9 juxtabasally as when empty and at rest and with a bottom or wad-disc device 17, hereinafter described, shown resting within body 8 near its lip or mouth 22 and in juxtaposition there-between and upon the top plane 16 of cylinder 10 of body 9 and in which position during and after functioning, as hereinafter described, said wad-disc device and appertaining apparatus holds the full mass and or residue of cream content 18 respectively at common and selected or constant level in respect and relation to mouth or lip 22 of body 8 as shown and indicated in Figures 2, 4 and 5 respectively. Further described body 8 is substantially hollow with a tubular shell-like surrounding wall 20 of suitable size and thickness and shaped and formed similar to a hollow cylinder chamber 21a or cold cream jar with an extra circular opening and inward extending circular projection or ledge 21—21 fabricated in its bottom end as herein below described. Both top and bottom ends respectively of body 8 are provided with suitable circular outside threading and with suitable screw caps 23 Figure 2 and 23 and 24 Figure 4 respectively, adaptable in respect and relation thereto and which said screw caps function and encase and hold cream content 18 efficiently therein and prevent leakage. Fabricated at the bottom end of and within chamber 21a of body 8 Figure 2 and at right angle to the inner surface 20a of wall 20 and extending circumferentially therearound its periphery and forming a circular orifice therein said bottom end of body 8 as above described, is an inner ledge 21—21 and upon which ledge devised and adaptable to rest and function in respect and relation thereto and thereon is a circular wad-disc device 17 as shown in Figure 4. Said wad-disc device 17 is provided with an upturned peripheral sealing lip or edging 17a of suitable size, thickness, lap and height made of any suitable or desired material or substance and which device is shown resting upon the round shaped top horizontal plane 16 of cylinder 10 of body 9 Figure 2 with its upturned lap or edging 17a engaging peripherally and in close juxtaposition the inside surrounding surface 20a of circular wall 20 of chamber 21a of body 8 and adaptably movable and slidable therewithin and thereagainst said surface 20a of said wall 20 and adaptable further to function flexibly and efficiently to hold said wad-disc device 17a at proper functionable and slidable position while in action and while at rest in respect and relation thereto and efficiently function to prevent leakage of the cream content 18 as said device functions in combination with other appurtenance of the invention en masse to lift, elevate, place and maintain cream content 18 of body 8 at a selected and convenient constant level.

While I have described and specified the wad-disc device 17 as a device having upturned peripheral edging 17a in Figure 2, it is understood I am not to be restricted to such device and edging and that I may devise, fabricate and employ any usable shape and form of device and edging for the purposes described and I refer in analogy to corresponding wad-disc device 17b having a straight even circular peripheral edge 16a and which may be of any suitable size and thickness and adaptable, functionable, usable and slidable in respect and relation to said circular surface 20a of wall 20 and its constituent ledge 21—21 of body 8 as above set forth indicated and described.

Fabricated tangent to and upon the outer surface of wall 20 of body 8 are two diametrically disposed vertical strips in the form of spurs or swedges 19—19 of suitable length, width and thickness and which engage and function efficiently with guiding grooves 15—15 of body 9 and are slidable vertically in respect and relation thereto as above described and as shown in Figures 2 and 3.

In Figure 4 body 8 is shown separated and apart from body 9 as an independent cream container unit or body and in which form and construction it functions as a double-capped "refill jar" and or "replacing unit" for the device, adaptable to attach to and detach from body 9 at will and function in respect and relation to body 9 in a complete embodiment of the device of the invention as described in foregoing and as shown in Figure 2, but in which said form and as such device body 8 as constructed and shown may also be used separated apart from body 9 as an ordinary cold cream jar by simply removing top screw cap 23 and allowing bottom screw cap 24 stand as set thereon locking therewithin body 8 cream content 18 as shown. It is understood that I may use two adaptable similar or regular screw caps to enclose and hold cream content 18 therewithin body 8 but not of necessity, for as shown and indicated in Figure 4 I use a regular screw cap 23 to close the mouth or top or lip end 22 of said device body 8 and a different type screw cap 24 to close the basal or bottom end 21—21 of the device. Described further the bottom lower screw cap 24 is fabricated and formed with a circular concavo-convexo concentric upset 25 stamped or impressed or otherwise fabricated therein at its central area and extending circumferentially to suitable operable distance toward its periphery and so devised to function dually as a bottom screw cap 24 of body 8 as described and as a base 25 for wad-disc device 17 to rest upon and adaptable in juxtaposition in respect and relation thereto to hold said device 17 substantially in place as shown in Figure 4 when body 8 is used separate and apart from body 9 but which screw cap 24 is conveniently removable when body 8 is used in combination with body 9 as described, and removed in analogy as shown in phantom body 8a, imposed over body 8, shown reposing in body 9 Figure 2 respectively.

Figure 3 is a sectional top view segment of bodies 8 and 9 and cylinder 10 of body 9 respectively taken through 3—3 of Figure 2 and shows body 8 poised in relative operable and functionable position within said interstitial well 14—14 of body 9 as described in foregoing. Tangent to body 8 is one of said guiding spur-swedges 19 shown engaging in juxtaposition with one of said guiding grooves 15 of body 9 and by means of which body 8 is guided vertically downward and into the receptacle body 9 as the device functions as devised and as hereinafter described.

In Figure 5 there is provided a supplementary dispensing device attachment in the form of a screw cap device 23a adaptable and functionable in respect and relation to body 8. Fabricated in said screw cap device 23a are a multiplicity of eyelets 26. Above screw cap 23a and shown projecting therefrom are a multiplicity of extrusions 27 of said cream content 18. It is obvious as shown and it is understood that the functioning upward lift of cylinder 10 its top plane 16 in contact with and pressing and acting against wad-disc device 17b, forcibly compresses cream content 18 within body 8 upward and against screw cap 23a and through said eyelets 26 fabricated therein forming and depositing on the outside and top level of said screw cap 23a a multiplicity of said cream extrusions 27 and from whence as devised they may be dispensed and lifted away in a thin or selected layer by the sweeping sliding action of the hand or fingers as shown and illustrated in Figure 7.

It is understood that I am not to be restricted to but one form or style of body or base in the construction and embodiment of the device as a whole and complete apparatus as is shown in perspective in Figure 1 in oblong form, and that I may construct or fabricate said upper cream container body 8 and said lower basal receptacle body 9 respectively in divers and sundry styles, shapes and forms such as round, square, club, clover, oval, twin, hexagonal and any other conceivable style, shape and form or multiple which may be suitable, operable and functionable as devised.

In Figure 6 body 9 is devised in the form and shape of a hexagon or castor having a 6-gang multiplicity of round receptacles a—b—c—d—e—f respectively and a common level pivotal or sunken pocket center G and which said receptacles in multiplicity as shown are efficiently adaptable and functionable as multiple 6-gang bases for equal multiples of said upper body 8 as above described and indicated.

Referring to Figure 7 there is shown and indicated by illustration the cream content 18 of body 8 as raised and elevated to a selected and convenient height in the form of a thin layer above the top level of the mouth or lip 22 of body 8 by function of the device as described herein, ipso facto forming thereabove said top level what I name, term and describe as the toga or constant level of the cold cream content 18, as in respect and relation to the said mouth or lip 22 of said cream container body 8 of the device and which said "constant level" is the primal object of the device of the invention and for which the device as a whole and in toto functionates to bring about and perform and successfully accomplish; and further and in fulfillment of said object and said function of the device and as shown therein, is the index finger F of the hand H, in the act of slithering off a thin layer or slice X of said "constant level" of said cream content 18 and for which, as set forth in the foregoing, my invention was purposely devised.

In the construction of the device as shown in Figure 2 an intervening interstitial space 21a is formed between inside circular wall 20a of wall 20 of body 8 and the opposing outer circular wall 10a of cylinder 10 of body 9. However, it is understood that at my discretion I may use an alternate form of construction designed to eliminate said interstitial space 21a, and which in certain instances of construction and fabrication may be desired and proved more valuable and functionable and operable, and which I accomplish by eliminating and doing away with circular ledge 21—21 of body 8 and by expanding the diameter and circumference of cylinder 10 of body 9 so that both said walls 20a and 10a of bodies 8 and 9 respectively meet in close juxtaposition and tangibility and are functionable and operable in combination with said parts and bodies, and maintaining all other appurtenances and constituents in respect and relation to the device as described and specified herein which might aid in its substantial construction and function and successful performance after the manner herein described and so as to operate as and for the purpose set forth.

In practice and operation the top and bottom screw caps 23 and 24 are removed from device body 8 Figure 4. The device is then placed and adapted as shown in Figure 2 superimposed as in "phantom" 8a above body 9. The round bottom orifice formed by peripheral ledge 21—21 of body 8 is then ringed over the head 16 of and around circular wall 10a of the body of cylinder 10 of body 9 and adjusted so that it penetrates upward and through the circular bottom orifice formed by ledge 21—21 of body 8 until its top plane 16 contacts sufficiently the bottom plane of wad-disc device 17 of body 8 and rests thereunder and thereagainst said wad-disc device in operable and functionable position in relation thereto. In said position the embodiment of the invention in toto is now set to operate and function to bring about the primal purpose and the full culmination of the object of the device of the invention. Thus set as described the hand of user exerts a suitable pressure downward upon upper body 8 shown in "phantom" as body 8a, and which downward action and pressure reciprocates and in turn causes the circular top plane 16 of cylinder 10 of body 9 to exert a corresponding and equal upward pressure against circular wad-disc device 17 and which said reciprocal pressure causes said wad-disc device 17 to function and lift and elevate the cream content 18 of body 8 to a convenient, selected or constant level above the mouth or lip 22 of body 8 and so that the said cream content 18 thus set up may be conveniently dispensed or slithered off by the sweeping action of the index finger F or other selectable fingers of hand H as shown in X and 18 Figure 7. As upper cream container body 8 functions in respect and relation to the lower basal body 9 as described the cream content 18 of body 8 is gradually used up and depleted after which said body 8 becomes empty and settles down and rests juxtabasally in interstitial well 14—14 of body 9 as shown in Figure 2. The empty cream body 8 may then be lifted out of said well 14—14 of body 9 and replaced as shown in phantom body 8a Figure 2 by another and full cream container unit-body 8 known and indicated respectively as a "refill jar" or "replacement unit" as shown and described in Figure 4 and the modus operandi repeated as desired.

I believe I am the first to devise a device in the class described wherein the device is constructed in two divisible and separable parts instead of but one part or single unit only as heretofore and which two parts in combination are operable as a single unit while in said combination and/or wherein one part of the two part combination may be separated apart from said two part combination and used as a single unit in simile with the outmoded one part or single unit cold cream jar described in the preamble and as above set forth, instituting an altogether new departure from the said outmoded one part single unit device named and described.

I have taken advantage of the knowledge and facts as set forth and described herein in causing my invention to be workable to the highest degree and extent to circumvent and prevent such conditions and obstacles set forth in the preamble regarding the outmoded single unit type cold cream jars from arising, insofar as possible, and therefore provide for such purposes my present invention in the form of a "mobile" and "divisible" and "detachable" and "constant level" cold cream or chemical cream dispensing jar or container.

Having described my invention, what I claim as new and useful and desired to secure by Letters Patent is:

1. In a dispensing device of the character described, a base with an annular well entering it from its upper end and establishing a vertically projecting column and a cylindrical wall spaced from and surrounding the column concentric therewith, a tubular container open at its upper and lower ends and having an inwardly extending projection at its lower end slidably engageable over the column, the container being entered in the well with the lower end portion of the container engaged over and spaced from the column and within said wall, and a rigid bottom slidable in the container having an upturned peripheral sealing lip slidable in the container, the bottom being retained in the container by the projection and supported by the column when the container is depressed relative to the base.

2. In a dispensing device of the character described, a base with an annular well entering it from its upper end and establishing a vertically projecting column and a wall spaced from and surrounding the column, the wall having a plurality of circumferentially spaced vertical guide grooves therein open at the top of the base, a tubular container open at its upper and lower ends and having an inwardly extending projection at its lower end, the container being slidably carried in the well with the lower end of the container engaged over the column and within said wall, vertical ribs on the exterior of the container engaged in the grooves from the upper ends thereof, a rigid bottom in the container having an upturned peripheral sealing lip slidably engaged in the container and retained in the container by the projection, the bottom being supported by the column when the container is depressed relative to the base.

3. In a dispensing device of the character described, a base with an annular well entering it from its upper end and establishing a vertically projecting column and a wall spaced from and surrounding the column, the wall having a plurality of circumferentially spaced vertical guide grooves therein, a tubular container open at its upper and lower ends and having an inwardly extending projection at its lower end, a closure threaded to the upper end of the container, the container being slidably carried in the well with its lower end engaged over the column and within said wall, vertical ribs on the exterior of the container engaged in the grooves holding the container against rotation in the well, a bottom in the container having an upturned peripheral sealing lip slidably engaged in the container, the bottom being retained in the container by the projection and being supported by the column when the container is depressed relative to the base, the upper end portion of the container being above the top of the base when the lower end of the container engages the bottom of the well, and the closure being confined to the said upper end portion of the container.

4. A container of the character described including, a tubular body open at its upper and lower ends, ribs on the exterior of the body extending longitudinally thereof, an annular inturned projection at the lower end of the body, a bottom slidably carried in the body and having an upturned peripheral sealing lip engaging the body, the bottom being retained in the body by the projection, a removable cap closing the upper end of the body and a removable cap closing the lower end of the body.

THOMAS J. NEWYLN.

REFERENCES CITED

The following references are of record in the file of this patent:

UNITED STATES PATENTS

| Number | Name | Date |
|---|---|---|
| 945,676 | Baron | Jan. 4, 1910 |
| 1,522,975 | Phillips | Jan. 13, 1925 |
| 1,742,157 | Christian | Dec. 31, 1929 |
| 1,956,073 | Krause | Apr. 24, 1934 |
| 2,001,819 | Elle et al. | May 21, 1935 |
| 2,085,446 | Phillippe | June 29, 1937 |
| 2,111,582 | Crewe | Mar. 22, 1938 |
| 2,115,591 | Sherbondy | Apr. 26, 1938 |
| 2,458,120 | Volpini | Jan. 4, 1949 |